US012809396B2

(12) United States Patent
Iwahori et al.

(10) Patent No.: US 12,809,396 B2
(45) Date of Patent: Nov. 24, 2026

(54) CONTROL DEVICE, SYSTEM, AND METHOD

(71) Applicant: TOYOTA JIDOSHA KABUSHIKI KAISHA, Toyota (JP)

(72) Inventors: Kento Iwahori, Nagoya (JP); Noritsugu Iwazaki, Sunto-gun (JP); Satoshi Takahashi, Yokohama (JP); Takeshi Kanou, Seto (JP); Yuki Okamoto, Ebina (JP); Kento Ohara, Nisshin (JP); Go Inoue, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 18/984,142

(22) Filed: Dec. 17, 2024

(65) Prior Publication Data

US 2025/0208632 A1 Jun. 26, 2025

(30) Foreign Application Priority Data

Dec. 25, 2023 (JP) ................................ 2023-217970

(51) Int. Cl.
*G05D 1/65* (2024.01)
*G05D 1/622* (2024.01)
*G05D 109/10* (2024.01)
*G05D 111/30* (2024.01)

(52) U.S. Cl.
CPC ............... *G05D 1/65* (2024.01); *G05D 1/622* (2024.01); *G05D 2109/10* (2024.01); *G05D 2111/32* (2024.01)

(58) Field of Classification Search
CPC ...... G05D 1/65; G05D 1/622; G05D 2109/10; G05D 2111/32; B60W 50/12; B60W 2556/45; B60W 30/146; B60W 60/0025; G06Q 50/40; G05B 19/0423; G05B 2219/25257
See application file for complete search history.

(56) References Cited

U.S. PATENT DOCUMENTS

2016/0375926 A1* 12/2016 Lubischer .............. B62D 1/183
74/493
2017/0320529 A1* 11/2017 Nordbruch ........... G05D 1/0212
2020/0140028 A1* 5/2020 Wells ................... G05D 1/0225
2020/0156722 A1* 5/2020 Watkins ............... B62D 15/025
2022/0289277 A1* 9/2022 Narasimhan ........... B62D 5/001
2022/0390937 A1* 12/2022 Watanabe ............ G05D 1/0038
2023/0145508 A1* 5/2023 Kaphengst ....... G05B 19/41805
701/24
2024/0329649 A1 10/2024 Yasuyama et al.

FOREIGN PATENT DOCUMENTS

JP 2017-538619 A 12/2017
JP 2021-140638 A 9/2021
JP 7392886 B1 12/2023

* cited by examiner

*Primary Examiner* — Navid Z. Mehdizadeh
*Assistant Examiner* — Shelley Marie Osterhout
(74) *Attorney, Agent, or Firm* — Oliff PLC

(57) ABSTRACT

A control device that is mounted on a moving object that is able to be moved by unmanned driving includes: an acquisition unit that acquires update information transmitted from outside of the moving object according to a process from manufacturing to sales of the moving object; a storage unit that stores unmanned driving information used for the unmanned driving; and an update unit that updates the unmanned driving information stored in the storage unit according to the update information.

7 Claims, 11 Drawing Sheets

CONTROL DEVICE, SYSTEM, AND METHOD

CROSS REFERENCE TO RELATED APPLICATIONS

This application claims priority to Japanese Patent Application No. 2023-217970, filed Dec. 25, 2023, the disclosure of which is incorporated by reference herein in its entirety.

BACKGROUND

Field

The present disclosure relates to a control device, a system, and a method.

There have been known techniques of making a vehicle run by unmanned driving during a vehicle manufacturing process (for example, Japanese Patent Application Publication (Translation of PCT Application) No. 2017-538619).

Operation permitted to a moving object such as a vehicle differs per manufacturing process of the moving object. Hence, a technique that is able to adjust the operation of the moving object according to the process is desired.

SUMMARY

The present disclosure may be implemented as following aspects.

(1) A first aspect of the present disclosure provides a control device that is mounted on a moving object that is able to be moved by unmanned driving. This control device includes: an acquisition unit that acquires update information transmitted from outside of the moving object according to a process from manufacturing to sales of the moving object; a storage unit that stores unmanned driving information used for the unmanned driving; and an update unit that updates the unmanned driving information stored in the storage unit according to the update information.

The control device according to this aspect is able to adjust an operation of the moving object during unmanned driving per process by updating the unmanned driving information.

(2) According to the control device according to the above aspect, the unmanned driving information may include restriction information for restricting the operation of the moving object, and the update unit may update the restriction information.

The control device according to this aspect is able to flexibly change the restriction to be placed on the operation of the moving object per process. Consequently, it is possible to prevent excessive restriction of the operation of the moving object.

(3) According to the control device according to the above aspect, the unmanned driving information may include an upper limit value of a speed of the moving object as the restriction information, and the update unit may update the upper limit value of the speed of the moving object.

The control device according to this aspect is able to set the speed of the moving object within an allowable range per process.

(4) According to the control device according to the above aspect, the update unit may lower the upper limit value of the speed of the moving object in a process where a person exists around the moving object compared to a process where a person does not exist around the moving object.

The control device according to this aspect is able to reduce the probability that the moving object contacts the person.

(5) According to the control device according to the above aspect, the unmanned driving information may include an upper limit value of a turning angle of the moving object as the restriction information, and the update unit may update the upper limit value of the turning angle of the moving object.

The control device according to this aspect is able to set the turning angle of the moving object within an allowable range per process.

(6) According to the control device according to the above aspect, the update unit may lower the upper limit value of the turning angle of the moving object in a process where the moving object frequently performs driving forward compared to a process where the moving object performs the driving forward less.

The control device according to this aspect is able to reduce the probability that the moving object contacts the person.

(7) According to the control device according to the above aspect, the moving object may be a vehicle that includes a steer-by-wire type steering device including a steering wheel and wheels, the unmanned driving information may include information related to restriction of an operation of the steering wheel as the restriction information, and in a process where a person is in the moving object during the unmanned driving, the update unit may update the restriction information so that a direction of the steering wheel is not changed even when a direction of the wheel is changed.

The control device according to this aspect is able to prevent turning of the steering wheel from bothering the person when the person is in the moving object.

(8) According to the control device according to the above aspect, in a process after the moving object is shipped from a factory that manufactures the moving object, the update unit may update the restriction information so that the restriction of the operation of the moving object is lifted or the restriction of the operation of the moving object is relaxed compared to a process before the shipping.

The control device according to this aspect is able to flexibly change the restriction placed on the operation of the moving object from inside or outside of the factory. Consequently, it is possible to prevent excessive restriction of the operation of the moving object.

(9) A second aspect of the present disclosure provides a server device. This server device includes: an acquisition unit that acquires process information related to the process from manufacturing to sales of a moving object that is able to be moved by unmanned driving; and an update instruction unit that transmits, to the moving object, update information for updating unmanned driving information stored in a storage unit of the moving object and used for the unmanned driving according to the process information.

The server device according to this aspect is able to adjust the operation of the moving object during unmanned driving per process by updating the unmanned driving information.

(10) A third aspect of the present disclosure provides a system. This system includes: a moving object that is able to be moved by unmanned driving, and includes a storage unit that stores unmanned driving information used for the unmanned driving; and a server device that includes an acquisition unit that acquires process information related to the process from manufacturing to sales of the moving object, and an update instruction unit that transmits, to the moving object, update information for updating the unmanned driving information stored in the storage unit according to the process information.

The system according to this aspect is able to adjust the operation of the moving object during unmanned driving per process by updating the unmanned driving information.

(11) A fourth aspect of the present disclosure provides a control device that is mounted on a moving object that is able to be moved by unmanned driving. This control device includes: an acquisition unit that acquires process information related to the process from manufacturing to sales of the moving object; a storage unit that stores unmanned driving information used for the unmanned driving; and an update unit that updates the unmanned driving information stored in the storage unit according to the update information.

The control device according to this aspect is able to adjust the operation of the moving object during unmanned driving per process by updating the unmanned driving information.

(12) A fifth aspect of the present disclosure provides a method. This method includes: acquiring process information related to a process from manufacturing to sales of a moving object that is able to be moved by unmanned driving; and updating unmanned driving information stored in a storage unit of the moving object and used for the unmanned driving according to the process information.

The method according to this aspect is able to adjust the operation of the moving object during unmanned driving per process by updating the unmanned driving information.

The present disclosure may also be implemented by various aspects other than the device, the system, and the method. The present disclosure may be implemented as, for example, a computer program and a recording medium having the computer program recorded thereon.

DETAILED DESCRIPTION

A. First Embodiment

Figure 1:
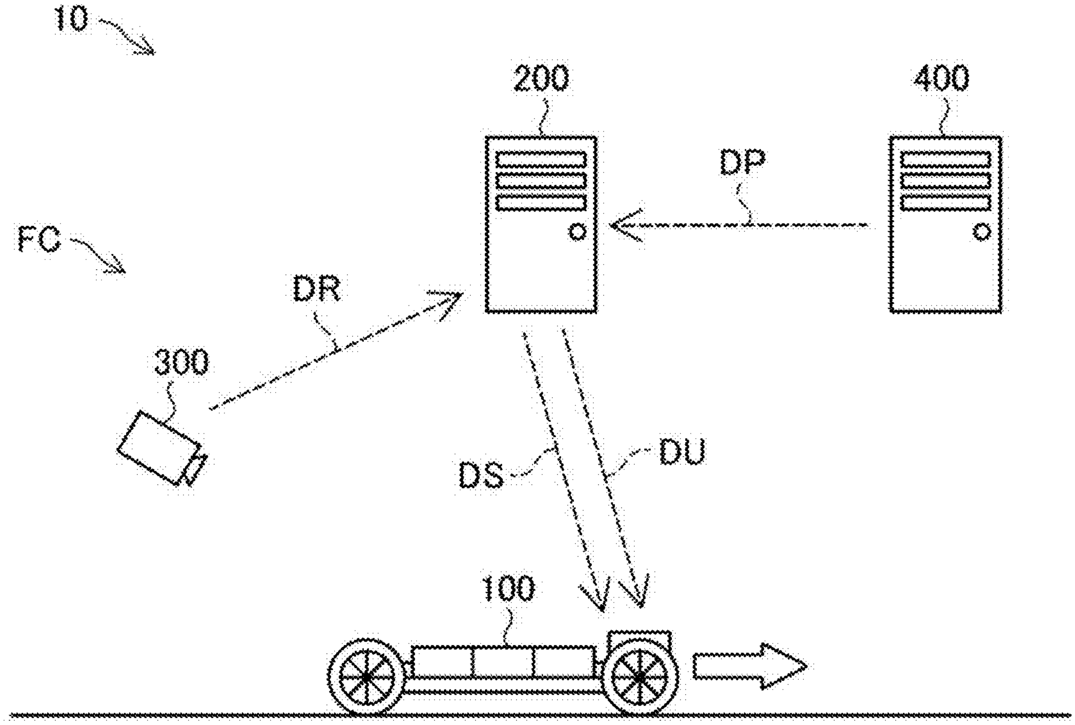
FIG. 1 is an explanatory view illustrating a configuration of a system according to a first embodiment.

FIG. 1 is an explanatory view illustrating a configuration of a system 10 according to the first embodiment. In the present embodiment, the system 10 is used to move a moving object by unmanned driving in a factory FC that manufactures moving objects. The system 10 includes a vehicle 100, a server device 200, at least one external sensor 300, and a process management device 400. In the present embodiment, the vehicle 100 corresponds to a "moving object" according to the present disclosure.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, or a construction vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

Figure 2:
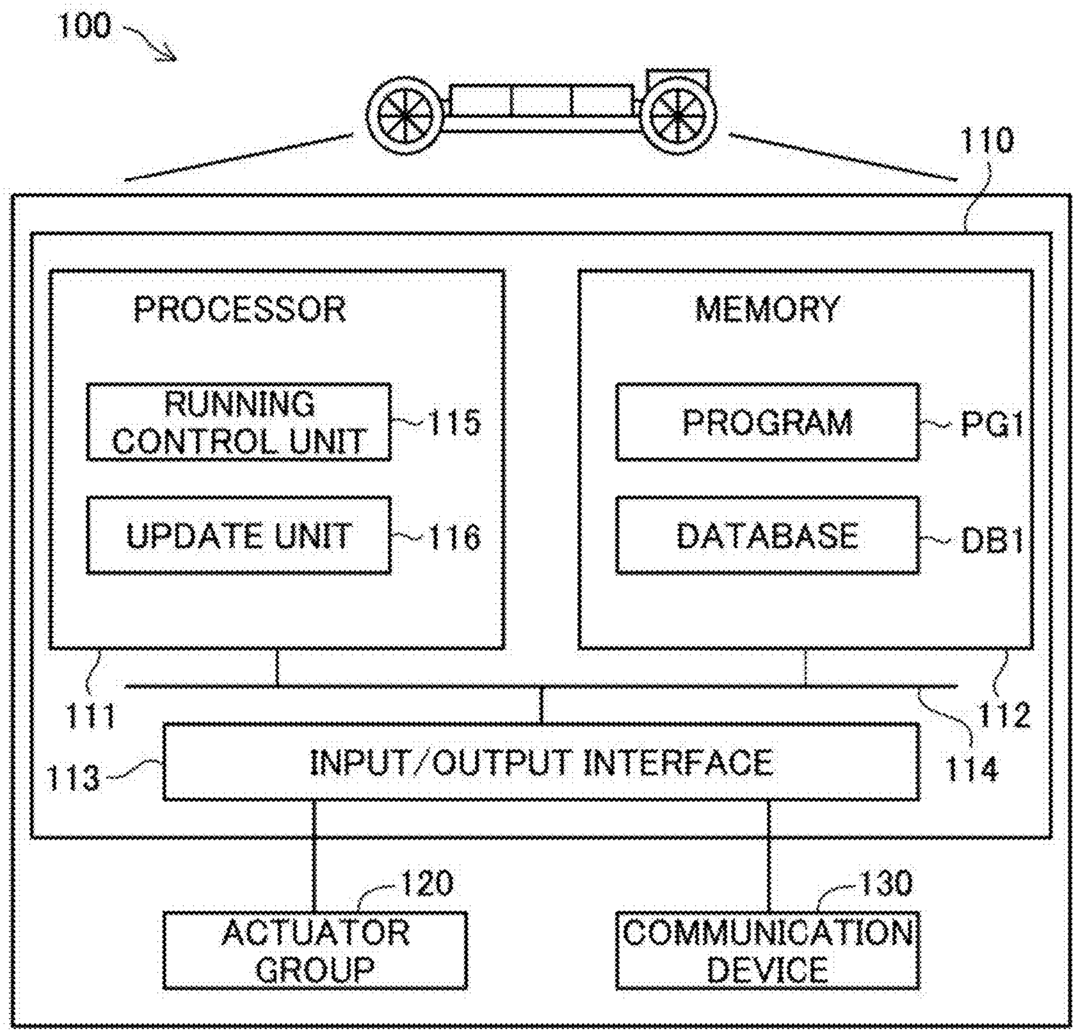
FIG. 2 is an explanatory view illustrating a configuration of a vehicle according to the first embodiment.

FIG. 2 is an explanatory view illustrating a configuration of the vehicle 100 according to the present embodiment. FIG. 2 illustrates the vehicle 100 having the form of a platform. In the present embodiment, the vehicle 100 is an electric vehicle, and is configured to be able to run by remote control. The vehicle 100 only needs to be configured to be able to run by remote control, and may have the form of a platform or may have a form of a finished car. The vehicle 100 includes a vehicle control device 110 that controls each unit of the vehicle 100, an actuator group 120 that includes at least one actuator that is driven under control of the vehicle control device 110, and a communication device 130 for communicating with the server device 200 by wireless communication. The actuator group 120 includes an actuator of a driving device for accelerating the vehicle 100, an actuator of a steering device for changing the traveling direction of the vehicle 100, and an actuator of a braking device for decelerating the vehicle 100. The driving device includes a battery, a running motor that is driven using power of the battery, and wheels that are rotated by the running motor. The actuator of the driving device includes the running motor. In the present embodiment, the vehicle 100 includes a steer-by-wire type steering device. The steer-by-wire type steering device includes a steering wheel, an actuator that changes the direction of the wheels according to the direction of the steering wheel, and an actuator that changes the direction of the steering wheel according to the direction of the wheels. In the steer-by-wire type steering device, the linkage between the direction of the steering wheel and the direction of the wheels is able to be switched on and off.

The vehicle control device 110 is configured as a computer that includes a processor 111, a memory 112, an input/output interface 113, and an internal bus 114. The processor 111, the memory 112, and the input/output interface 113 are bidirectionally communicably connected through the internal bus 114. The input/output interface 113 is connected with the actuator group 120 and the communication device 130. Note that the memory 112 corresponds to a "storage unit" according to the present disclosure.

Information used for unmanned driving of the vehicle 100 is stored in advance in the memory 112. In the following description, the information used for unmanned driving will be referred to as unmanned driving information. In the present embodiment, a database DB1 is stored as the unmanned driving information in advance in the memory 112. The database DB1 includes restriction information for restricting an operation of the vehicle 100. More specifically, in the present embodiment, the database DB1 includes an upper limit value of a speed of the vehicle 100, an upper limit value of a turning angle of the vehicle 100, and information related to on and off of linkage between the direction of the steering wheel and the direction of the wheels of the steer-by-wire type steering device as the restriction information. In the present disclosure, an angle of the wheels with respect to the anteroposterior axis of the vehicle 100 will be referred to as a turning angle. Note that the restriction information is not limited to the upper limit values of the speed and the turning angle of the vehicle 100, and may be, for example, an upper limit value of an acceleration of the vehicle 100. The restriction information is not limited to the upper limit values, and may be, for example, a lower limit value. The restriction information is not limited to information related to numerical values such as the upper limit values and the lower limit values, and may be information related to a state such as on and off.

The processor 111 functions as a running control unit 115 and an update unit 116 by executing a computer program PG1 stored in advance in the memory 112. The running control unit 115 is able to make the vehicle 100 run by controlling the actuator group 120 in response to a passenger's operation when the passenger is in the vehicle 100. The running control unit 115 is able to make the vehicle 100 run by controlling the actuator group 120 according to a running control signal DS received from the server device 200 irrespectively of whether or not a passenger is in the vehicle 100. The running control signal DS is a control signal for making the vehicle 100 run. In the present embodiment, the running control unit 115 controls the actuator group 120 so that the speed of the vehicle 100 does not exceed the upper limit value of the speed recorded in the database DB1, and the turning angle of the vehicle 100 does not exceed the upper limit value of the turning angle recorded in the database DB1.

The update unit 116 updates unmanned driving information stored in the memory 112. In the present embodiment, the update unit 116 updates the database DB1 stored in the memory 112. The update unit 116 updates the database DB1 using update information DU when the update information DU is received from the server device 200. The update information DU includes new restriction information. The update unit 116 updates the database DB1 by rewriting the restriction information stored in the database DB1 with the new restriction information included in the update information DU. Rewriting the restriction information includes at least one of addition, change, and deletion of the restriction information. Note that the update information DU may not be information for updating the restriction information such as the upper limit values included in the unmanned driving information, but information for updating target values or the like included in the unmanned driving information.

Figure 3:
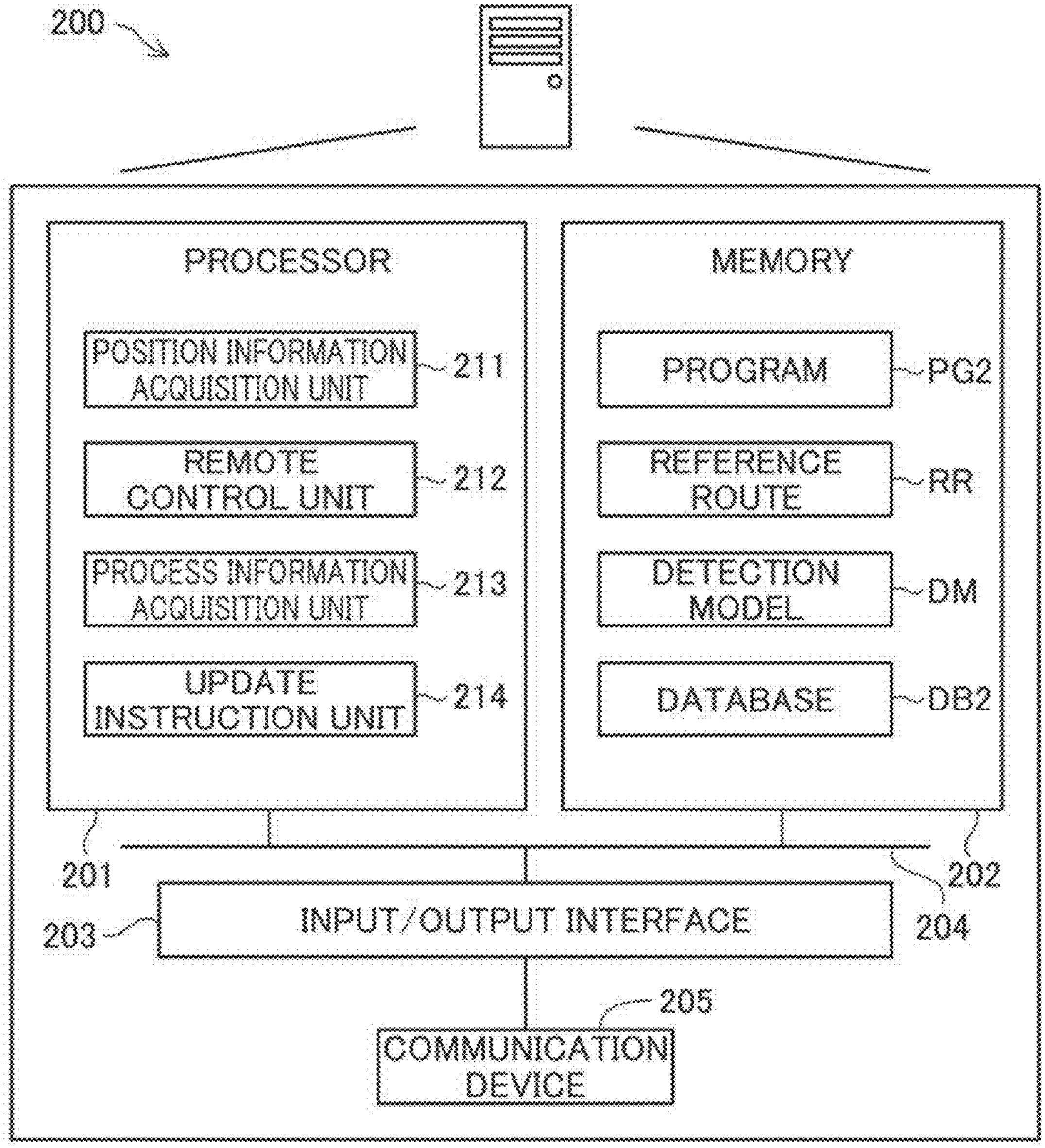
FIG. 3 is an explanatory view illustrating a configuration of a server device according to the first embodiment.

FIG. 3 is an explanatory view illustrating a configuration of the server device 200 according to the present embodiment. The server device 200 is configured as a computer that includes a processor 201, a memory 202, an input/output interface 203, and an internal bus 204. The processor 201, the memory 202, and the input/output interface 203 are bidirectionally communicably connected through the internal bus 204. The input/output interface 203 is connected with a communication device 205 that communicates with the vehicle 100 by wireless communication. In the present embodiment, the communication device 205 is able to communicate with the vehicle 100 by wireless communication, and, moreover, is able to communicate with the external sensor 300 and the process management device 400 by wired communication or wireless communication.

The processor 201 functions as a position information acquisition unit 211, a remote control unit 212, a process information acquisition unit 213, and an update instruction unit 214 by executing a computer program PG2 stored in advance in the memory 202. The position information acquisition unit 211 acquires position information of the vehicle 100 using a detection result DR of the external sensor 300. In the following description, the position information of the vehicle 100 will be referred to as vehicle position information.

The remote control unit 212 generates the running control signal DS using the vehicle position information, and transmits the generated running control signal DS to the vehicle 100. In the present embodiment, the running control signal DS includes the acceleration and the turning angle of the vehicle 100 as parameters. The running control signal DS may include the speed of the vehicle 100 as a parameter in place of the acceleration of the vehicle 100 or in addition to the acceleration of the vehicle 100.

The process information acquisition unit 213 acquires process information DP related to a process from start of manufacturing to sales of the vehicle 100. In the present embodiment, the process information acquisition unit 213 acquires the process information DP from the process management device 400. The process information DP indicates a current process of the vehicle 100. Note that, when a correspondence between the position of the vehicle 100 and a process performed at the position is known, the process information acquisition unit 213 may acquire the current process of the vehicle 100 from position information indicating the current position of the vehicle 100. From whether or not a predetermined electronic part is attached to the vehicle 100, whether the current process is before or after a process of attaching the electronic part may be acquired. For example, the current process of the vehicle 100 may be acquired from a connection confirmation result between the vehicle control device 110 and the electronic part attached to the vehicle 100.

The update instruction unit 214 generates the update information DU for updating the unmanned driving information stored in the memory 112 of the vehicle 100 according to the process information DP of the vehicle 100, and transmits the generated update information DU to the vehicle 100. In the present embodiment, the update instruction unit 214 generates the update information DU for updating the database DB1 stored in the memory 112 of the vehicle 100. A database DB2 in which each process related to the vehicle 100, and restriction information related to restriction that needs to be placed on the vehicle 100 in each process are associated is stored in advance in the memory 202 of the server device 200. The update instruction unit 214 generates the update information DU using the process information DP acquired by the process information acquisition unit 213 and the database DB2. More specifically, the update instruction unit 214 acquires the restriction information matching the process information DP acquired by the process information acquisition unit 213 by referring to the database DB2, and generates the update information DU including the acquired restriction information. Note that, in a case where the update information DU matching the process information DP is stored in advance in the memory 202, the update instruction unit 214 may acquire the update information DU from the memory 202 without generating the update information DU.

As illustrated in FIG. 1, the external sensor 300 is a sensor located outside of the vehicle 100. The external sensor 300 is used to detect the position and the direction of the vehicle 100. In the present embodiment, the external sensor 300 is a camera installed in the factory FC. The external sensor 300 includes an unillustrated communication device, and is able to communicate with the server device 200 by wired communication or wireless communication.

The process management device 400 manages the whole process from order acceptance to sales of the vehicle 100. Order acceptance to sales include processes such as manufacturing and shipping. The process management device 400 includes at least one computer. The process management device 400 includes a database in which various pieces of information of the vehicle 100 are recorded. The various pieces of information to be recorded in the database include, for example, an identification number of the vehicle 100, contents of each process, and information indicating the current process of the vehicle 100. The process management device 400 includes an unillustrated communication device, and is able to communicate with the server device 200, various facilities of the factory FC, and various facilities of dealers that sell the vehicles 100 by wired communication or wireless communication.

Figure 4:
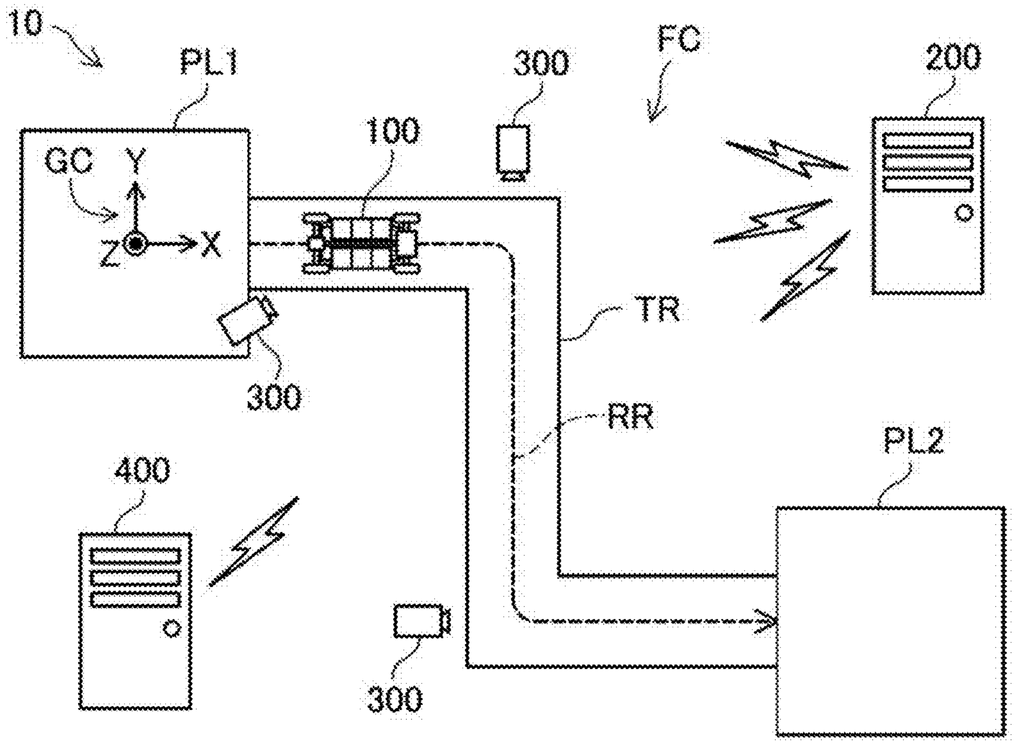
FIG. 4 is an explanatory view illustrating how a vehicle is run by remote control in a factory.

FIG. 4 is an explanatory view illustrating how the vehicle 100 is run by remote control in the factory FC. In the present embodiment, the factory FC includes a first place PL1 and a second place PL2. The first place PL1 and the second place PL2 are connected by a track TR on which the vehicle 100 is able to run. A plurality of the external sensors 300 are installed around the track TR. The first place PL1 is a place where work of assembling the vehicle 100 is performed, and the second place PL2 is a place at which work of inspecting the vehicle 100 is performed. The vehicle 100 assembled at the first place PL1 is able to be run by remote control. The vehicle 100 having passed the inspection at the second place PL2 is then shipped from the factory FC. Note that the first place PL1 is not limited to the place where the work of assembling the vehicle 100 is performed, and may be, for example, the place at which the work of inspecting the vehicle 100 is performed. The second place PL2 is not limited to the place where the work of inspecting the vehicle 100 is performed, and may be, for example, the place at which the vehicle 100 in a shipping standby state is stored.

When the server device 200 remotely controls the vehicle 100, the vehicle 100 moves from the first place PL1 to the second place PL2 along a reference route RR. The server device 200 is able to acquire a relative position and direction of the vehicle 100 with respect to the reference route RR in real time using the external sensors 300. An arbitrary position in the factory FC may be represented by X, Y, and Z coordinates of a global coordinate system GC. The positions and the directions of the individual external sensors 300 are fixed, a relative relationship between the global coordinate system GC and device coordinate systems of the individual external sensors 300 is known, and a coordinate transformation matrix for mutually transforming the coordinates of the global coordinate system GC and coordinates of the device coordinate systems of the individual external sensors 300 is known. The system 10 according to the present embodiment is able to move the vehicle 100 by remote control from the first place PL1 to the second place PL2 without using a conveyance device such as a crane or a conveyor.

Figure 5:
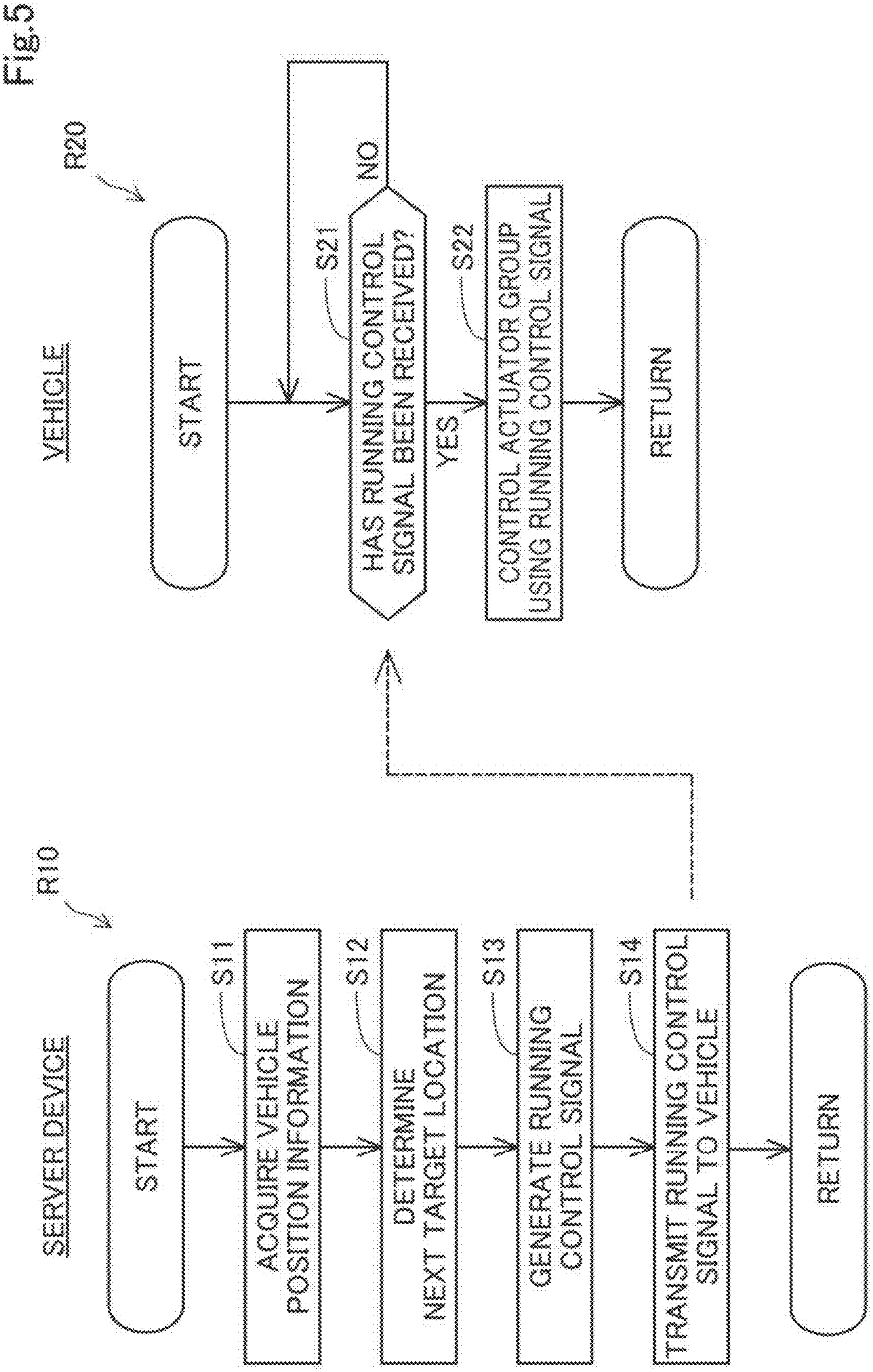
FIG. 5 is a flowchart illustrating a processing procedure of running control of the vehicle according to the first embodiment.

FIG. 5 is a flowchart illustrating a processing procedure of running control of the vehicle 100 according to the first embodiment. The processor 201 of the server device 200 repeatedly executes a first routine R10 at a predetermined cycle. The processor 111 of the vehicle control device 110 repeatedly executes a second routine R20 at a predetermined cycle.

The first routine R10 includes steps S11, S12, S13, and S14. In the step S11, the position information acquisition unit 211 acquires vehicle location information of the vehicle 100 using the detection result DR output from the external sensor 300, which is a sensor located outside the vehicle 100. The vehicle location information is position information that serves as the basis for generating the running control signal DS. In the present embodiment, the vehicle location information includes the position and orientation of the vehicle 100 in the reference coordinate system of the factory FC. In the present embodiment, the reference coordinate system of the factory FC is the global coordinate system GC, and any location in the factory FC is expressed with X, Y, and Z coordinates in the global coordinate system GC. In the present embodiment, the external sensor 300 is the camera, and the external sensor 300 outputs a captured image as a detection result. That is, in the step S11, the position information acquisition unit 211 acquires the vehicle location information using captured images acquired from the camera, which is the external sensor 300.

More specifically, in step S11, the position information acquisition unit 211 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system GC, thereby acquiring the location of the vehicle 100. The outer shape of the vehicle 100 in the captured image may be detected by inputting the captured image to a detection model DM using artificial intelligence, for example. The detection model DM is prepared in the system 10 or outside the system 10. The detection model DM is stored in advance in the memory 202 of the server device 200, for example. An example of the detection model DM is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model DM and the label. The position information acquisition unit 211 can acquire the orientation of the vehicle 100 through estimation based on the direction of a motion vector of the vehicle 100 detected from change in location of a feature point of the vehicle 100 between frames of the captured images using optical flow process, for example.

In step S12, the remote control unit 212 determines a target location to which the vehicle 100 is to move next. In the present embodiment, the target location is expressed by X, Y, and Z coordinates in the global coordinate system GC. The memory 202 of the server device 200 contains the reference route RR stored in advance as a route along which the vehicle 100 is to run. The route is expressed by a node indicating a departure place, a node indicating a way point, a node indicating a destination, and a link connecting nodes to each other. The remote control unit 212 determines the target location to which the vehicle 100 is to move next using the vehicle location information and the reference route RR. The remote control unit 212 determines the target location on the reference route RR ahead of a current location of the vehicle 100.

In step S13, the remote control unit 212 generates the running control signal DS for making the vehicle 100 run toward a determined target location. In the present embodiment, the running control signal DS includes the acceleration and the turning angle of the vehicle 100 as the parameters. The remote control unit 212 calculates a running speed of the vehicle 100 from a transition of the position of the vehicle 100, and compares the calculated running speed with a target speed. As a whole, the remote control unit 212 determines the acceleration to accelerate the vehicle 100 when the running speed is slower than the target speed, and determines the acceleration to decelerate the vehicle 100 when the running speed is faster than the target speed. Furthermore, the remote control unit 212 determines the turning angle and the acceleration so that the vehicle 100 does not deviate from the reference route RR when the vehicle 100 is located on the reference route RR, and determines the turning angle and the acceleration so that the vehicle 100 returns to the reference route RR when the vehicle 100 is not located on the reference route RR, in other words, when the vehicle 100 deviates from the reference route RR.

In step S14, the remote control unit 212 transmits the generated running control signal DS to the vehicle 100. Subsequently, the server device 200 finishes the first routine R10, and starts the first routine R10 again after a predetermined time passes.

The second routine R20 includes steps S21 and S22. In step S21, the running control unit 115 of the vehicle 100 stands by until receiving the running control signal DS from the server device 200. When the running control unit 115 receives the running control signal DS, the processing moves to step S22, the running control unit 115 makes the vehicle 100 run at the acceleration and the turning angle indicated by the running control signal DS by controlling the actuator group 120 using the received running control signal DS. Subsequently, the vehicle control device 110 finishes the second routine R20, and starts the second routine R20 again after a predetermined time passes.

Figure 6:
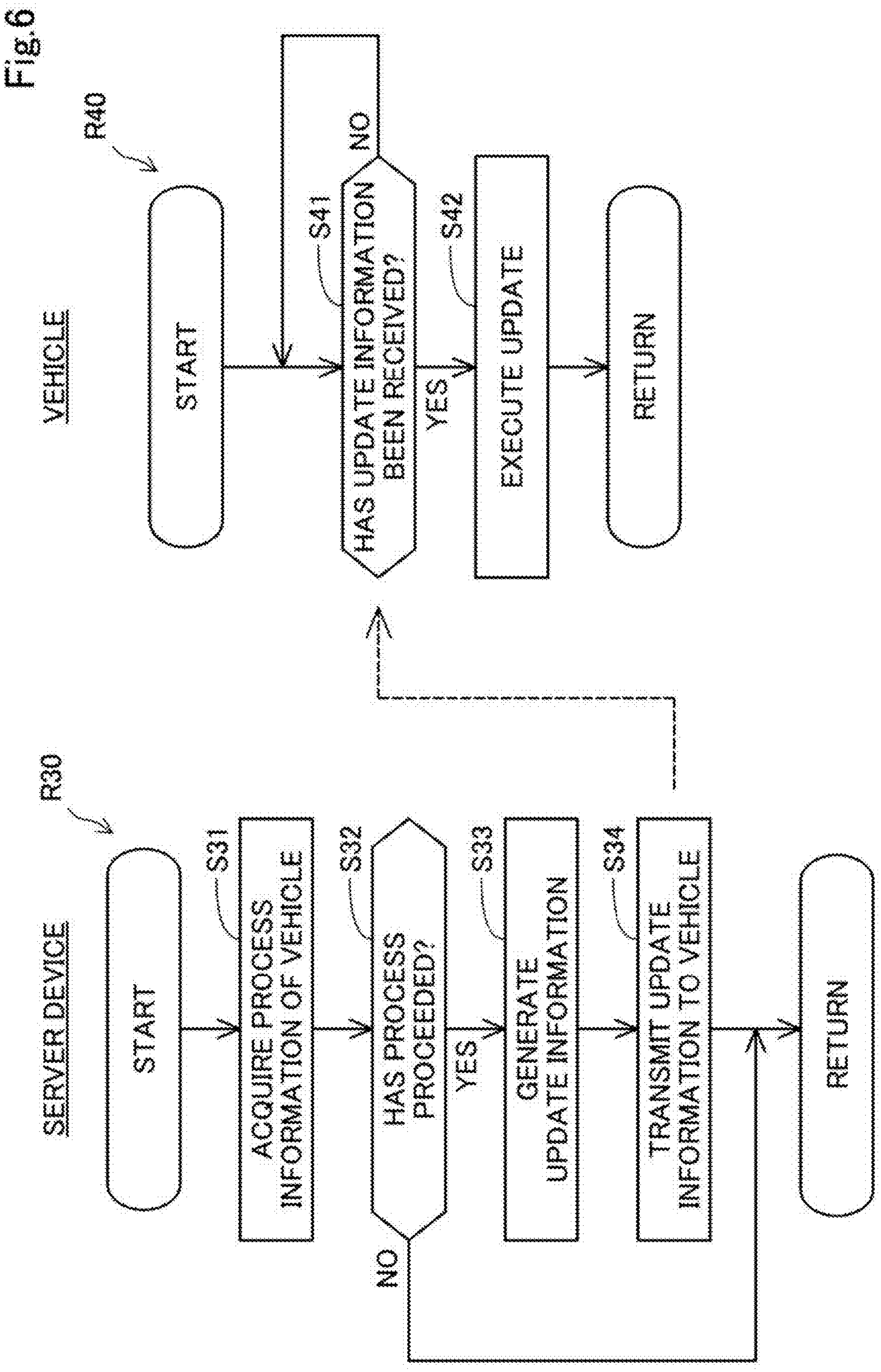
FIG. 6 is a flowchart illustrating a processing procedure of update processing according to the first embodiment.

FIG. 6 is a flowchart illustrating a processing procedure of updating the unmanned driving information according to the first embodiment. The processor 201 of the server device 200 repeatedly executes a third routine R30 at a predetermined cycle. The processor 111 of the vehicle control device 110 repeatedly executes a fourth routine R40 at a predetermined cycle.

The third routine R30 includes steps S31, S32, S33, and S34. In step S31, the process information acquisition unit 213 of the server device 200 acquires the process information DP related to the process of the vehicle 100. In the present embodiment, the process information acquisition unit 213 acquires the process information DP from the process management device 400.

In step S32, the process information acquisition unit 213 determines whether or not the process of the vehicle 100 has proceeded. The process information acquisition unit 213 is able to determine whether or not the process of the vehicle 100 has proceeded by comparing the process information DP acquired this time with the process information DP acquired previously. When it is not determined in step S32 that the process of the vehicle 100 has proceeded, the server device 200 finishes the third routine R30, and starts the third routine R30 again after the predetermined time passes. By contrast with this, when it is determined in step S32 that the process of the vehicle 100 has proceeded, the processing is advanced to step S33. When the process information DP of the vehicle 100 is acquired for the first time, the process information acquisition unit 213 may advance the processing to step S33 irrespectively of whether or not the process of the vehicle 100 has proceeded.

In step S33, the update instruction unit 214 generates the update information DU for updating the unmanned driving information stored in the memory 112 of the vehicle control device 110 according to the process indicated by the process information DP. In the present embodiment, the database DB1 is stored as the unmanned driving information in advance in the memory 112. The database DB1 includes the restriction information for placing restriction on the operation of the vehicle 100 during unmanned driving. The update instruction unit 214 generates the update information DU including new restriction information. In step S34, the update instruction unit 214 transmits the generated update information DU to the vehicle 100. Subsequently, the server device 200 finishes the third routine R30, and starts the third routine R30 again after the predetermined time passes.

The fourth routine R40 includes steps S41 and S42. In step S41, the update unit 116 of the vehicle 100 stands by until receiving the update information DU from the server device 200. When the update unit 116 receives the update information DU, the processing proceeds to step S42, and the update unit 116 updates the unmanned driving information stored in the memory 112 using the received update information DU. In the present embodiment, the update unit 116 updates the unmanned driving information by rewriting the restriction information included in the unmanned driving information which is stored in the memory 112 and with the new restriction information included in the update information. Subsequently, the vehicle control device 110 finishes the fourth routine R40, and starts the fourth routine R40 again after the predetermined time passes.

Figure 7:
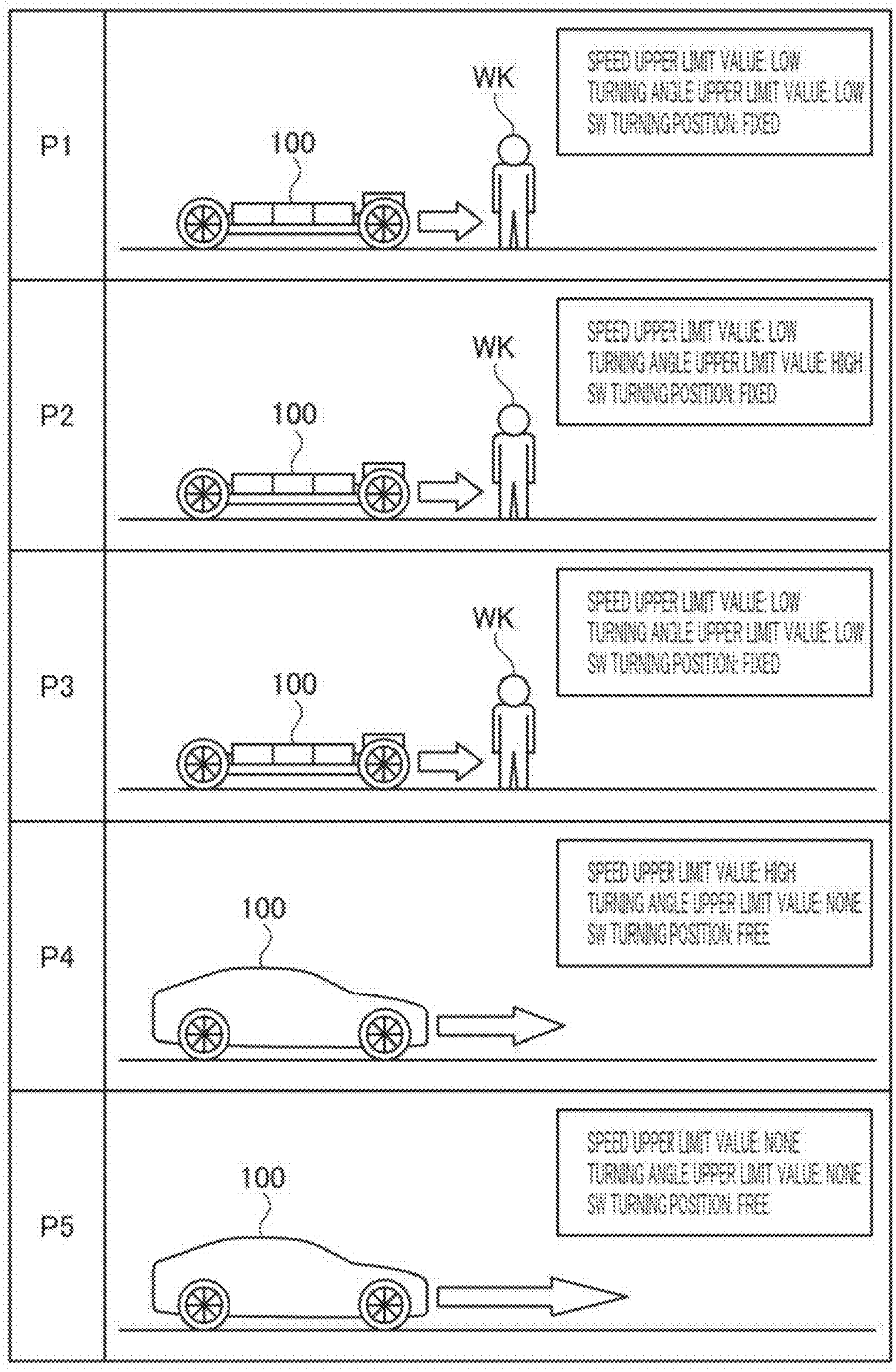
FIG. 7 is an explanatory view illustrating how unmanned driving information of the vehicle is updated according to a process.

FIG. 7 is an explanatory view illustrating how the unmanned driving information is updated according to a process. FIG. 7 illustrates how a first process P1, a second process P2, a third process P3, a fourth process P4, and a fifth process P5 are performed. The first process P1, the second process P2, the third process P3, the fourth process P4, and the fifth process P5 are performed in this order. The vehicle 100 has the form of the platform until the third process P3, and has a similar form to that of a finished car from the fourth process P4. When the process is switched, the above-described update processing updates the unmanned driving information stored in the memory 112 of the vehicle 100. In the present embodiment, the unmanned driving information is updated while the vehicle 100 runs by unmanned driving.

Since the first process P1 is a process where the vehicle 100 and people coexist, the upper limit value of the speed of the vehicle 100 is set low. The process where the vehicle 100 and the people coexist includes, for example, a process where a worker WK gets on the vehicle 100 and performs work, and a process where the worker WK performs work around the vehicle 100. By setting the upper limit value of the speed low, it is possible to prevent the vehicle 100 from contacting a person, and reduce impact at a time of contact even if the vehicle 100 contacts the person. Since the vehicle 100 runs on a straight route in the first process P1, the upper limit value of the turning angle of the vehicle 100 is set low. By setting the upper limit value of the turning angle low, it is possible to prevent the vehicle 100 from deviating from the route. The first process P1 is a process where the worker WK gets on the vehicle 100 and performs work, and therefore, when the steering wheel turns, the work of the worker WK is likely to be bothered. In a case where the vehicle 100 includes the steer-by-wire type steering device, a turning position of the steering wheel of the vehicle 100 is fixed in the first process P1. By fixing the turning position of the steering wheel, it is possible to prevent the work of the worker WK from being bothered.

When the process transitions to the second process P2, the unmanned driving information stored in the memory 112 of the vehicle 100 is updated. Since the second process P2 is the process where the vehicle 100 and the people coexist similarly to the first process P1, even when the unmanned driving information is updated, the upper limit value of the speed is maintained without being changed, and the turning position of the steering wheel is maintained without being unfixed. However, the vehicle 100 runs on a route including curves in the second process P2, so that it is possible to increase the upper limit value of the turning angle by updating the unmanned driving information compared to the first process P1. By increasing the upper limit value of the turning angle, it is possible to enable the vehicle 100 to easily turn the curve.

When the process transitions to the third process P3, the unmanned driving information stored in the memory 112 of the vehicle 100 is updated again. Since the third process P3 is the process where the vehicle 100 and the people coexist similarly to the first process P1 and the second process P2, even when the unmanned driving information is updated, the upper limit value of the speed is maintained without being changed, and the turning position of the steering wheel is maintained without being unfixed. The vehicle 100 runs on a straight route in the third process P3, so the upper limit value of the turning angle is decreased compared to the second process P2 by updating the unmanned driving information.

When the process transitions to the fourth process P4, the unmanned driving information stored in the memory 112 of the vehicle 100 is updated again. The fourth process P4 is not a process where the vehicle 100 and the people coexist. The fourth process P4 is a process where the vehicle 100 moves in a huge yard by remote control. The upper limit value of the turning angle is abolished by updating the unmanned driving information to enable the vehicle 100 to freely change the traveling direction in the yard. By abolishing the upper limit value of the turning angle, it becomes possible to steer the vehicle 100 at up to a maximum turning angle. Since it is not preferable that the vehicle 100 runs out of control due to an abnormality of the system 10, although the upper limit value of the speed is not abolished even when the unmanned driving information is updated, the upper limit value of the speed is increased by updating the unmanned driving information to reduce a movement time of the vehicle 100. Since the worker WK does not get on the vehicle 100 in the fourth process P4, the turning position of the steering wheel is unfixed by updating the unmanned driving information.

When the process transitions to the fifth process P5, the unmanned driving information stored in the memory 112 of the vehicle 100 is updated again. The fifth process P5 is a process where the vehicle 100 is shipped from the factory FC. Since the speed and the turning angle of the vehicle 100 do not need to be restricted anymore in the fifth process P5, the upper limit value of the speed is abolished by updating the unmanned driving information. As described above, the upper limit value of the turning angle and the turning position of the steering wheel have already been abolished and unfixed in the fourth process P4. Note that, when placing some restriction on the operation of the vehicle 100 even after shipping, the restriction may be placed on the operation of the vehicle 100 by updating the unmanned driving information. In this case, preferably, the restriction of the operation of the vehicle 100 is relaxed compared to the process before shipping by updating the unmanned driving information.

The system 10 according to the above-described present embodiment is able to adjust the operation of the vehicle 100 during unmanned driving according to each process by updating the unmanned driving information stored in the memory 112 of the vehicle 100 according to each process. Consequently, it is possible to make the operation of the vehicle 100 during unmanned driving an operation suitable for each process. Furthermore, since work contents and an environment of a work place differ per process, operation permitted to the vehicle 100 differs per process. When the operation permitted for the vehicle 100 is uniformly determined in accordance with a process whose restriction is severe, there is a problem that the operation of the vehicle 100 is excessively restricted in a process whose restriction is moderate. By contrast with this, according to the present embodiment, by updating the restriction information included in the unmanned driving information in each process, it is possible to operate the vehicle 100 within a permitted range in each process while preventing excessive restriction of the operation of the vehicle 100. Consequently, it is possible to enhance workability in each process. Furthermore, according to the present embodiment, the unmanned driving information is updated by wireless communication, so that it is possible to update the unmanned driving information even while the vehicle 100 is running.

B. Second Embodiment

Figure 8:
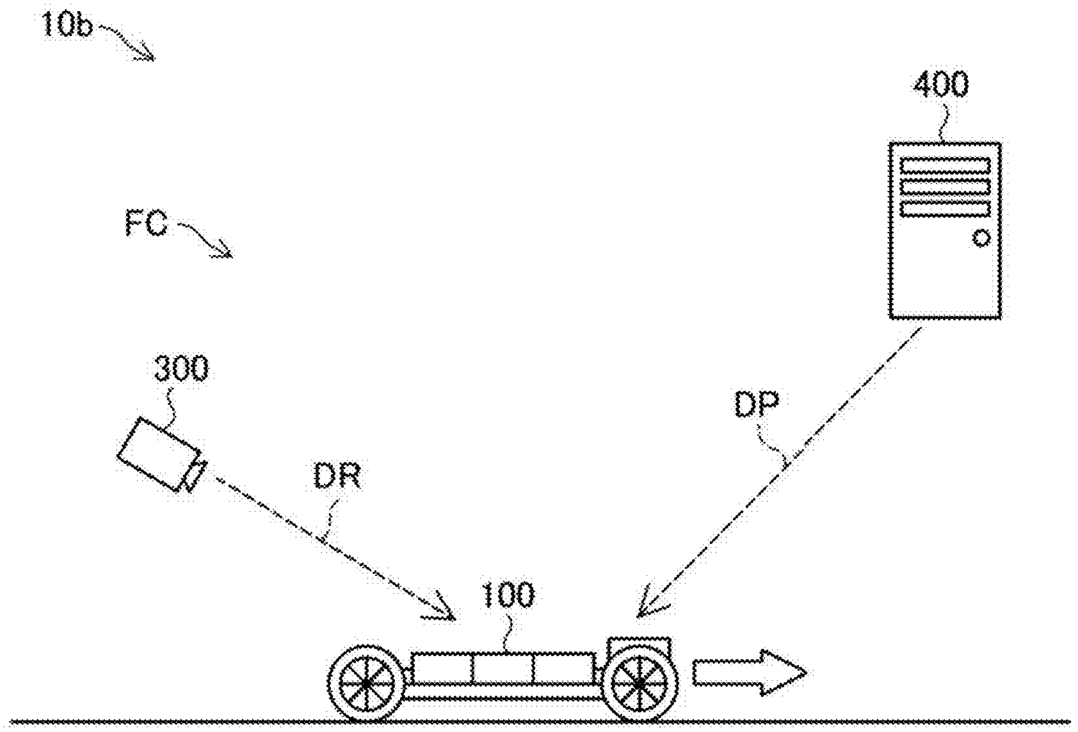
FIG. 8 is an explanatory view illustrating a configuration of the system according to a second embodiment.
Figure 9:
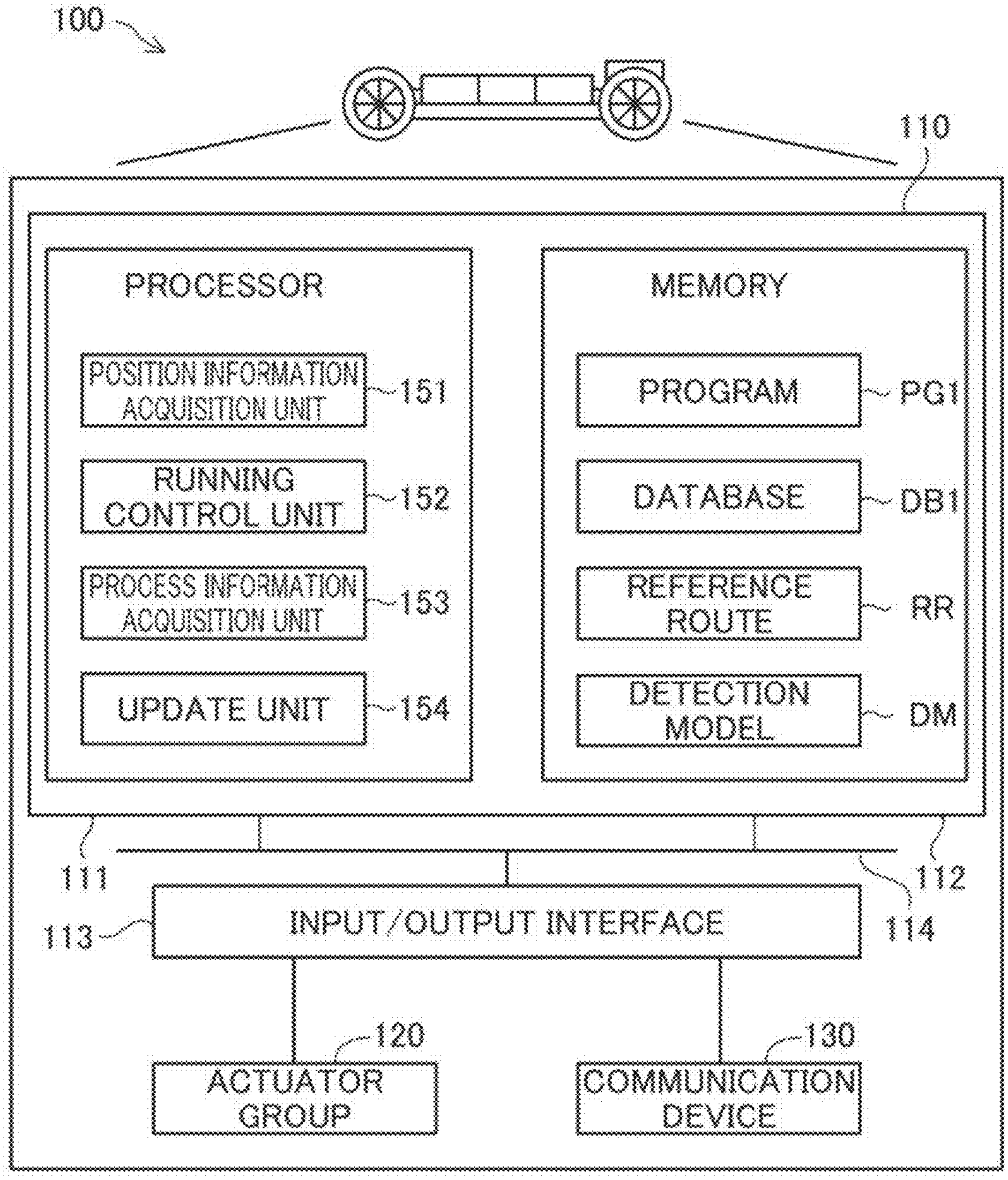
FIG. 9 is an explanatory view illustrating a configuration of the vehicle according to the second embodiment.

FIG. 8 is an explanatory view illustrating a configuration of a system 10*b* according to the second embodiment. FIG. 9 is an explanatory view illustrating the configuration of the vehicle 100 according to the present embodiment. The present embodiment differs from the first embodiment in that the system 10*b* does not include the server device 200 and the vehicle 100 runs by autonomous control. The other components are the same as those in the first embodiment unless otherwise specified.

In the present embodiment, as illustrated in FIG. 9, the vehicle 100 is configured to be able to run by autonomous control. The vehicle 100 is able to communicate with the external sensors 300 by wireless communication that uses the communication device 130. The memory 112 stores in advance a detection model DM, the reference route RR, and the database DB2 illustrated in FIG. 3 in addition to the computer program PG1 and the database DB1. In the following description, the database DB1 will be referred to as the first database DB1, and the database DB2 will be referred to as the second database DB2.

In the present embodiment, the processor 111 of the vehicle control device 110 functions as a position information acquisition unit 151, a running control unit 152, a process information acquisition unit 153, and an update unit 154 by executing the computer program PG1 stored in advance in the memory 112. The position information acquisition unit 151 acquires vehicle position information of the own vehicle using detection results acquired from the external sensors 300 similarly to the position information acquisition unit 211 illustrated in FIG. 3. The running control unit 152 generates the running control signal DS using the vehicle position information acquired by the position information acquisition unit 151. The running control unit 152 makes the own vehicle run by controlling the actuator group 120 using the generated running control signal DS. The process information acquisition unit 153 acquires the process information DP of the own vehicle similarly to the process information acquisition unit 213 illustrated in FIG. 3. In the present embodiment, the process information acquisition unit 153 acquires the process information DP from the process management device 400. The update unit 154 updates the unmanned driving information stored in the memory 112 according to the process information DP acquired by the process information acquisition unit 153.

Figure 10:
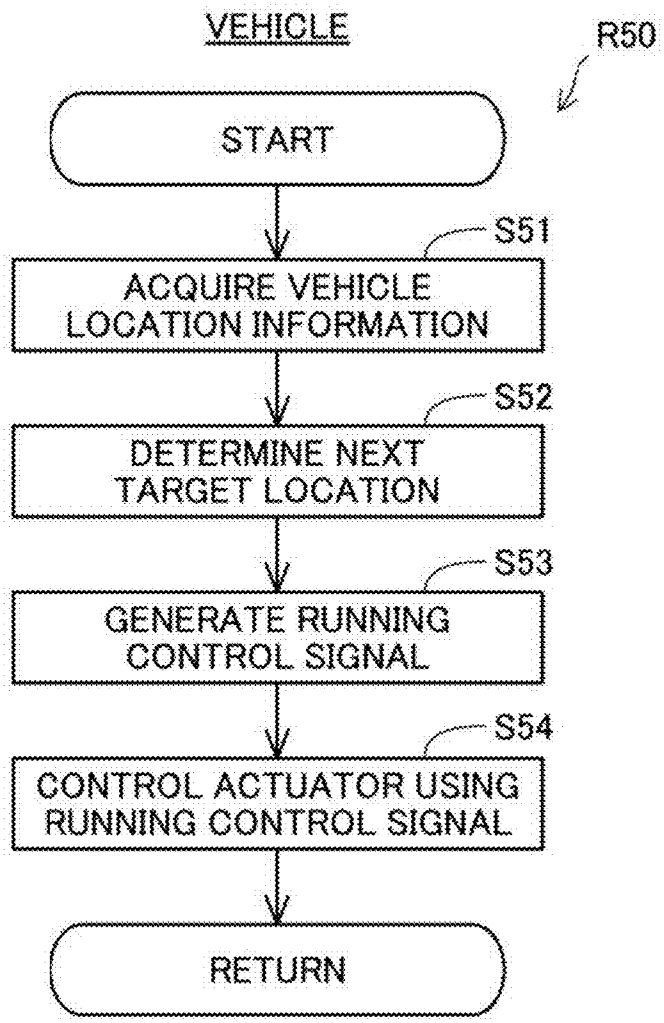
FIG. 10 is a flowchart illustrating a processing procedure of running control of the vehicle according to the second embodiment.

FIG. 10 is a flowchart illustrating a processing procedure of running control of the vehicle 100 according to the second embodiment. The processor 111 of the vehicle control device 110 repeatedly executes a fifth routine R50 at a predetermined cycle. The fifth routine R50 includes steps S51, S52, S53, and S54. In step S51, the running control unit 115 acquires the vehicle position information using the detection results DR output from cameras that are the external sensors 300. In step S52, the running control unit 115 determines a target location to which the vehicle 100 needs to travel next. In step S53, the running control unit 115 generates the running control signal DS to make the vehicle 100 run toward the determined target location. In step S54, the running control unit 115 makes the vehicle 100 run according to parameters indicated by the running control signal DS by controlling the actuator group 120 using the generated running control signal DS. Subsequently, the vehicle control device 110 finishes the fifth routine R50, and starts the fifth routine R50 again after the predetermined time passes.

Figure 11:
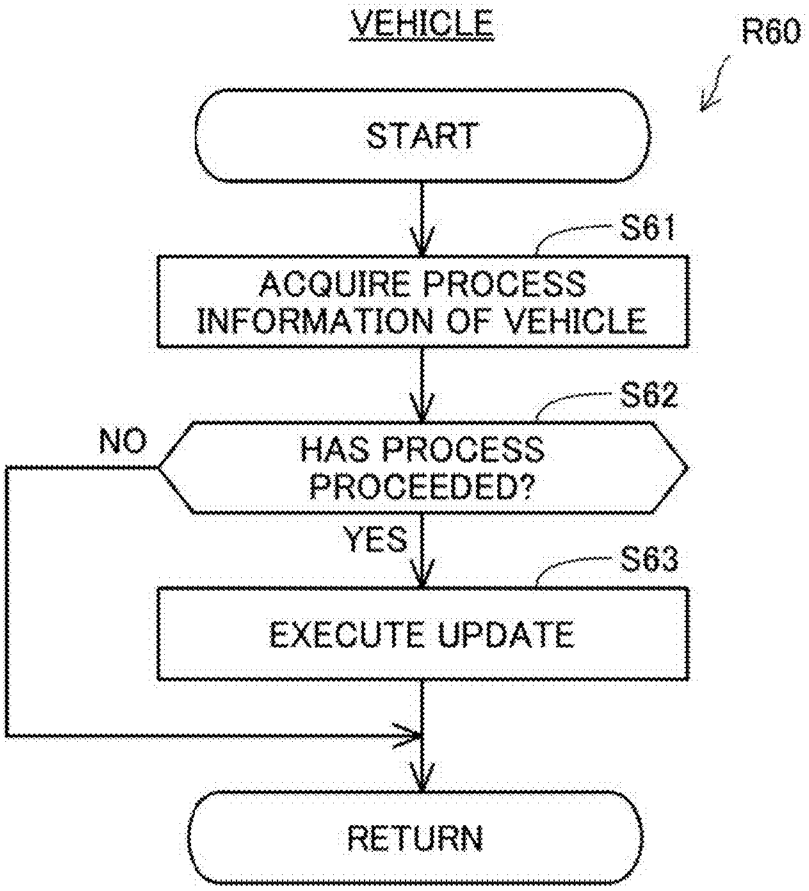
FIG. 11 is a flowchart illustrating a processing procedure of update processing according to the second embodiment.

FIG. 11 is a flowchart illustrating a processing procedure of updating the unmanned driving information according to the second embodiment. The processor 111 of the vehicle control device 110 repeatedly executes a sixth routine R60 at a predetermined cycle. The sixth routine R60 includes steps S61, S62, and S63. In step S61, the process information acquisition unit 153 of the vehicle control device 110 acquires the process information DP related to a process of the own vehicle. In step S62, the process information acquisition unit 153 determines whether or not the process of the own vehicle has proceeded. When it is not determined in step S62 that the process of the own vehicle has proceeded, the vehicle control device 110 finishes the sixth routine R60, and starts the sixth routine R60 again after a predetermined time passes. By contrast with this, when it is determined in step S62 that the process of the own vehicle has proceeded, the process information acquisition unit 153 advances processing to step S63. In step S63, the update unit 154 generates the update information DU according to the process indicated by the process information DP, and updates the unmanned driving information stored in the memory 112 using the generated update information DU. Subsequently, the vehicle control device 110 finishes the sixth routine R60, and starts the sixth routine R60 again after the predetermined time passes.

According to the above-described present embodiment, it is possible to make the vehicle 100 run by autonomous control of the vehicle 100 without remotely controlling the vehicle 100 by the server device 200. Furthermore, in the present embodiment, the vehicle 100 is able to update the unmanned driving information by itself according to the process without depending on the server device 200.

C. Other Embodiment (C1) In each of the above embodiments, the update units 116 and 154 update the database DB1 stored in the memory 112 as the unmanned driving information. By contrast with this, the update units 116 and 154 may update the computer program PG1 stored in the memory 112 as the unmanned driving information. When, for example, the computer program PG1 includes the restriction information for restricting the operation of the vehicle 100, the update units 116 and 154 may change contents of the restriction information by rewriting the computer program PG1.

(C2) In each of the above embodiments, by updating the unmanned driving information, (A) the upper limit value of the speed of the vehicle 100, (B) the upper limit value of the turning angle, and (C) settings related to on and off of the fixed turning position of the steering wheel are changed. By appropriately setting the upper limit value of the speed, it is possible to prevent the speed of the vehicle 100 from becoming excessively fast. By appropriately setting the upper limit value of the turning angle, it is possible to prevent the turning angle of the vehicle 100 in an unfinished state from becoming excessively large. By appropriately setting on and off of fixing of the turning position of the steering wheel, it is possible to enhance workability of the worker WK who gets on the vehicle 100 and performs work. The settings changed by updating the unmanned driving information are not limited to the settings related to above (A) to (C), and may be, for example, (D) an upper limit value of a change amount of the turning angle, (E) an accelerator pedal intervention threshold, (F) a brake pedal intervention threshold, (G) an upper limit value of the acceleration, (H) a hydraulic inspection standard value, and (I) settings related to control gains.

(D) By appropriately setting the upper limit value of the change amount of the turning angle, it is possible to prevent rapid change of the traveling direction of the vehicle 100. Consequently, when the worker WK exists around the vehicle 100, it is possible to reduce the probability that the vehicle 100 and the worker WK contact. Furthermore, when the worker WK gets on the vehicle 100 and performs work in a state where fixing of turning position of the steering wheel is switched to off, it is possible to prevent the turning position of the steering wheel from rapidly changing accompanying rapid change of the turning angle, and bothering the work of the worker WK.

(E) As for the accelerator pedal intervention threshold, when an operation amount of an accelerator pedal exceeds the accelerator pedal intervention threshold in the vehicle 100 during unmanned driving, the vehicle 100 during the unmanned driving executes an acceleration operation in response to the operation of the accelerator pedal. By appropriately setting the accelerator pedal intervention threshold, it is possible to prevent a running state of the vehicle 100 during the unmanned driving from becoming unstable even when the worker WK loses balance and unintentionally touches the accelerator pedal when the worker WK gets on the vehicle 100 during unmanned driving and performs work.

(F) As for the brake pedal intervention threshold, when an operation amount of a brake pedal exceeds the brake pedal intervention threshold in the vehicle 100 during unmanned driving, the vehicle 100 during unmanned driving executes the braking operation in response to the operation of the brake pedal. By appropriately setting the brake pedal intervention threshold, it is possible to prevent the running state of the vehicle 100 during the unmanned driving from becoming unstable even when the worker WK loses the balance and unintentionally touches the brake pedal when the worker WK gets on the vehicle 100 during the unmanned driving and performs work.

(G) As for the upper limit value of the acceleration, in the present disclosure, the acceleration includes both of an acceleration generated by accelerating the vehicle 100, and an acceleration generated by decelerating the vehicle 100. By appropriately setting the upper limit value of the acceleration, it is possible to prevent the running state of the vehicle 100 from becoming unstable due to rapid acceleration/deceleration of the vehicle 100. When the worker WK gets on the vehicle 100 and performs work, it is possible to prevent the worker WK from losing balance due to rapid acceleration/deceleration of the vehicle 100. Consequently, it is possible to enhance workability of the worker WK.

(H) The hydraulic inspection standard value refers to a pressure of a hydraulic pipe at a time of liquid leakage inspection of the hydraulic oil pipe of the brake. When the hydraulic inspection standard value is increased, for example, an electric hydraulic pump increases the pressure of the hydraulic pipe. By increasing the hydraulic inspection standard value prior to the liquid leakage inspection process of the hydraulic pipe, it is possible to make it easy to find liquid leakage from the hydraulic pipe at the time of inspection. After the liquid leakage inspection process of the hydraulic pipe is finished, the hydraulic standard value is preferably reset to a normal value.

(I) As for the control gains, control gains related to vertical control and horizontal control of the vehicle 100 may be changed. Here, the vertical control refers to control related to movement in a front/rear direction of the vehicle 100, and the horizontal control refers to control related to movement in a left/right direction of the vehicle 100. By, for example, increasing the control gain related to the horizontal control of the vehicle 100, it is possible to enhance followability for the reference route RR. In this regard, since, when the control gain related to the horizontal control is increased, the direction of the vehicle 100 is likely to rapidly change, it is preferable to lower the control gain related to the horizontal control in a process where the worker WK exists around the vehicle 100. When, for example, unmanned driving of the vehicle 100 is temporarily stopped at a break time of the factory FC or the like, and then the unmanned driving of the vehicle 100 is resumed, the control gain related to the vertical control of the vehicle 100 may be increased. Consequently, it is possible to shorten the time taken until the vehicle 100 reaches the target speed, so that it is possible to efficiently move the vehicle 100. The control gain to be changed by updating the unmanned driving information may be a control gain related to feedback control or may be a control gain of feedforward control. The control gain to be changed by updating the unmanned driving information may be a control gain for controlling a torque of a motor or may be a control gain for controlling a rotation angle of the motor. The control gain may be a control gain for controlling the acceleration of the vehicle 100.

In addition, various parameters used for unmanned driving of the vehicle 100 may be changed by updating the unmanned driving information. Since, for example, the vehicle 100 having the form of the platform and the vehicle 100 having the form of the finished car differ in the number of parts assembled in the vehicle 100, the weights, the vehicle heights, and wheel alignment, the external appearances, and the like of the vehicles 100 are different. Accordingly, in response to change in the number of parts assembled in the vehicle 100, in other words, in response to change of the weight or the like of the vehicle 100, parameters influenced by the weight or the like of the vehicle 100 may be adjusted. A conversion coefficient of the driving force and the acceleration of the vehicle 100, the control gain, and the like may be changed according to, for example, the weight of the vehicle 100. Furthermore, immediately after the vehicle 100 enters a state where the vehicle 100 is able to be run by unmanned driving, followability for the reference route RR is likely to become low due to a driving forward turning angle error of the vehicle 100. Hence, in a process immediately after the vehicle 100 enters the state where the vehicle 100 is able to be run by unmanned driving, the upper limit value of the speed of the vehicle 100, the upper limit value of the turning angle, an approach allowable range of people and obstacles, and the control gain related to horizontal control may be differed from those in a subsequent process to enhance the followability for the reference route RR. By, for example, narrowing the approach allowable range to people and obstacles, the vehicle 100 is able to approach closer to the people and the obstacles, it is possible to widen a runnable range of the vehicle 100 to allow the vehicle 100 to easily return to the reference route RR. By, for example, increasing the control gain related to the horizontal control, it is possible to enhance the followability for the reference route RR. Furthermore, there is a probability that parts are not sufficiently fixed to the vehicle 100 until inspection is finished after the parts are assembled to the vehicle 100. Hence, the parameters such as the upper limit value of the speed and the upper limit value of the turning angle of the vehicle 100 may be adjusted to prevent the vehicle 100 from rapidly accelerating or decelerating or rapidly changing the direction until the inspection is finished after the parts are assembled to the vehicle 100. Consequently, it is possible to prevent the parts and wire harness connectors of the vehicle 100 from being detached due to the rapid acceleration/deceleration or the rapid change of the direction of the vehicle 100.

In addition, an operation of opening doors may be restricted or all windows may be kept closed in a waterproof inspection process by updating the unmanned driving information. Consequently, it is possible to prevent water from entering inside the vehicle through the doors or the windows at the time of the waterproof inspection. Driving of wipers may be restricted in a process where the worker performs work around the wipers. Consequently, it is easy to perform the work around the wipers. The turning position of the steering wheel may be kept at a midpoint during suspension inspection of the vehicle 100. Consequently, it is possible to smoothly perform the suspension inspection of the vehicle 100. Driving of the motor for adjusting the optical axis of a headlamp may be restricted in an optical axis inspection process of the headlamp. On/off of a camera adjustment mode may be switched in an adjustment process of an in-vehicle millimeter wave radar and cameras. Furthermore, a setting value for each destination country stored in the memory 112 of the vehicle control device 110 may be updated. The server device 200 is able to grasp the destination country from a vehicle identification number. There is, for example, a case where gasoline cars have a different exhaust gas regulation value per destination country. By changing the setting value for each destination country, it is possible to change settings that suit to regulations of the destination country.

(C3) In each of the above embodiments, by updating the unmanned driving information stored in the memory 112 of the vehicle 100 according to each process, a change is added to the operation that is permitted to the vehicle 100 during unmanned driving. By contrast with this, in a case where the positions and the processes of the vehicle 100 are associated, by acquiring the position information of the vehicle 100 and updating the unmanned driving information according to the position information of the vehicle 100, a change may be added to the operation that is permitted to the vehicle 100 during unmanned driving. Furthermore, in a case where the running distance and the processes of the vehicle 100 are associated, by acquiring the running distance of the vehicle 100 and updating the unmanned driving information according to the running distance of the vehicle 100, a change may be added to the operation that is permitted to the vehicle 100 during unmanned driving.

(C4) In each of the above described embodiments, the external sensor 300 is not limited to the camera but may be the distance measuring device, for example. The distance measuring device is a light detection and ranging (LiDAR) device, for example. In this case, detection result output from the external sensor 300 may be three-dimensional point cloud data representing the vehicle 100. The server device 200 and the vehicle 100 may acquire the vehicle location information through template matching using the three-dimensional point cloud data as the detection result and reference point cloud data, for example.

(C5) In the above described first embodiment, the server device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server device 200 may acquire vehicle location information, determine a target location to which the vehicle 100 is to move next, and generate a route from a current location of the vehicle 100 indicated by the acquired vehicle location information to the target location. The server device 200 may generate a route to the target location between the current location and a destination or generate a route to the destination. The server device 200 may transmit the generated route to the vehicle 100. The vehicle 100 may generate a running control signal in such a manner as to cause the vehicle 100 to run along the route received from the server device 200 and control the actuator group 120 using the generated running control signal.

(2) The server device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the actuator group 120 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C6) In the above described second embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C7) In the above described second embodiment, the vehicle 100 acquires vehicle location information using detection result from the external sensor 300. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the actuator group 120 of the vehicle 100 using the generated running control signal. In this case, the vehicle 100 is capable of running without using any detection result from the external sensor 300. The vehicle 100 may acquire target arrival time or traffic congestion information from outside the vehicle 100 and reflect the target arrival time or traffic congestion information in at least one of the route and the running control signal.

(C8) In the above-described first embodiment, the server device 200 automatically generates a running control signal to be transmitted to the vehicle 100. By contrast, the server device 200 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server device 200 through wire communication or wireless communication, for example, and the server device 200 may generate a running control signal responsive to the operation on the operating device.

(C9) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory FC, or a remaining component such as a bodyshell may be mounted on the vehicle 100 after the vehicle 100 is shipped from the factory FC while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C10) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C12) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(C13) The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A control device that is mounted on a moving object that is able to be moved by unmanned driving, the control device comprising:

a memory in which is stored unmanned driving information used for the unmanned driving of the moving object, the unmanned driving information including restriction information that restricts an operation of the moving object during the unmanned driving; and a processor configured to:

(i) acquire update information transmitted from outside of the moving object according to each of a plurality of processes that are performed on the moving object from manufacturing to sales of the moving object;

(ii) update the unmanned driving information stored in the memory using the update information that has been acquired from the outside of the moving object, and (iii) control at least one actuator of the moving object during the unmanned driving of the moving object according to the unmanned driving information stored in the memory, wherein:

different restriction information is associated with each of the plurality of processes, the update information includes new restriction information associated with a current process performed on the moving object, the processor updates the unmanned driving information stored in the memory by rewriting the restriction information included in the unmanned driving information with the new restriction information included in the update information, the restriction information includes an upper limit value of a speed of the moving object, the new restriction information lowers the upper limit value of the speed for a process, of the plurality of processes, in which a person exists around the moving object compared with a process, of the plurality of processes, in which no person exists around the moving object, and the processor controls the at least one actuator of the moving object during the unmanned driving of the moving object during performance of the processes while maintaining the speed of the moving body at or below the upper limit value of the restriction information most recently stored in the memory.

2. The control device according to claim 1, wherein the unmanned driving information further includes an upper limit value of a turning angle of the moving object as the restriction information, and the processor further updates the upper limit value of the turning angle of the moving object for each of the plurality of processes.

3. The control device according to claim 2, wherein the processor lowers the upper limit value of the turning angle of the moving object in a process, of the plurality of processes, in which the moving object frequently performs driving forward compared to a process, of the plurality of processes in which the moving object performs less of the driving forward.

4. The control device according to claim 1, wherein the moving object is a vehicle that includes a steer-by-wire type steering device including a steering wheel and wheels, the unmanned driving information further includes information related to restriction of an operation of the steering wheel as the restriction information, and in a process, of the plurality of processes, in which a person gets on the moving object during the unmanned driving, the processor further updates the restriction information so that a direction of the steering wheel is not changed even when a direction of the wheel is changed.

5. The control device according to claim 1, wherein, in a process after the moving object is shipped from a factory that manufactures the moving object, the processor updates the restriction information so that the restriction of the operation of the moving object is lifted or the restriction of the operation of the moving object is relaxed compared to a process, of the plurality of processes, before the moving object was shipped.

6. A system comprising:

a moving object that is able to be moved by unmanned driving, and that includes (1) a memory configured to store unmanned driving information used for the unmanned driving of the moving object, the unmanned driving information including restriction information that restricts an operation of the moving object during the unmanned driving, and (2) a first processor configured to control at least one actuator of the moving object during the unmanned driving of the moving object according to the unmanned driving information stored in the memory; and a server device having a second processor configured to (i) acquire process information related to each of a plurality of processes that are performed on the moving object from manufacturing to sale of the moving object, and (ii) transmit update information to the moving object according to the process information, the update information is an information that the first processor uses to update the unmanned driving information stored in the memory of the moving object, wherein:

different restriction information is associated with each of the plurality of processes, the update information includes new restriction information associated with a current process performed on the moving object, the first processor updates the unmanned driving information stored in the memory by rewriting the restriction information included in the unmanned driving information with the new restriction information included in the update information, the restriction information includes an upper limit value of a speed of the moving object, the new restriction information lowers the upper limit value of the speed for a process, of the plurality of processes, in which a person exists around the moving object compared with a process, of the plurality of processes, in which no person exists around the moving object, and the first processor controls the at least one actuator of the moving object during the unmanned driving of the moving object during performance of the processes while maintaining the speed of the moving body at or below the upper limit value of the restriction information most recently stored in the memory of the moving object.

7. A method comprising:

storing, in a memory of a moving object that is able to be moved by unmanned driving, unmanned driving information used for the unmanned driving of the moving object, the unmanned driving information including restriction information that restricts an operation of the moving object during the unmanned driving;

acquiring, by a processor of the moving object, update information transmitted from outside of the moving object according to each of a plurality of processes that are performed on the moving object from manufacturing to sale of the moving object, updating, by the processor, the unmanned driving information stored in the memory using the update information that has been acquired from the outside of the moving object; and controlling, by the processor, at least one actuator of the moving object during the unmanned driving of the moving object according to the unmanned driving information stored in the memory, wherein:

different restriction information is associated with each of the plurality of processes, the update information includes new restriction information associated with a current process performed on the moving object, the unmanned driving information stored in the memory is updated by the processor rewriting the restriction information included in the unmanned driving information with the new restriction information included in the update information, the restriction information includes an upper limit value of a speed of the moving object, the new restriction information lowers the upper limit value of the speed for a process, of the plurality of processes, in which a person exists around the moving object compared with a process, of the plurality of processes, in which no person exists around the moving object, and the processor controls the at least one actuator of the moving object during the unmanned driving of the moving object during performance of the processes while maintaining the speed of the moving body at or below the upper limit value of the restriction information most recently stored in the memory.

* * * * *